United States Patent Office 3,442,123
Patented May 6, 1969

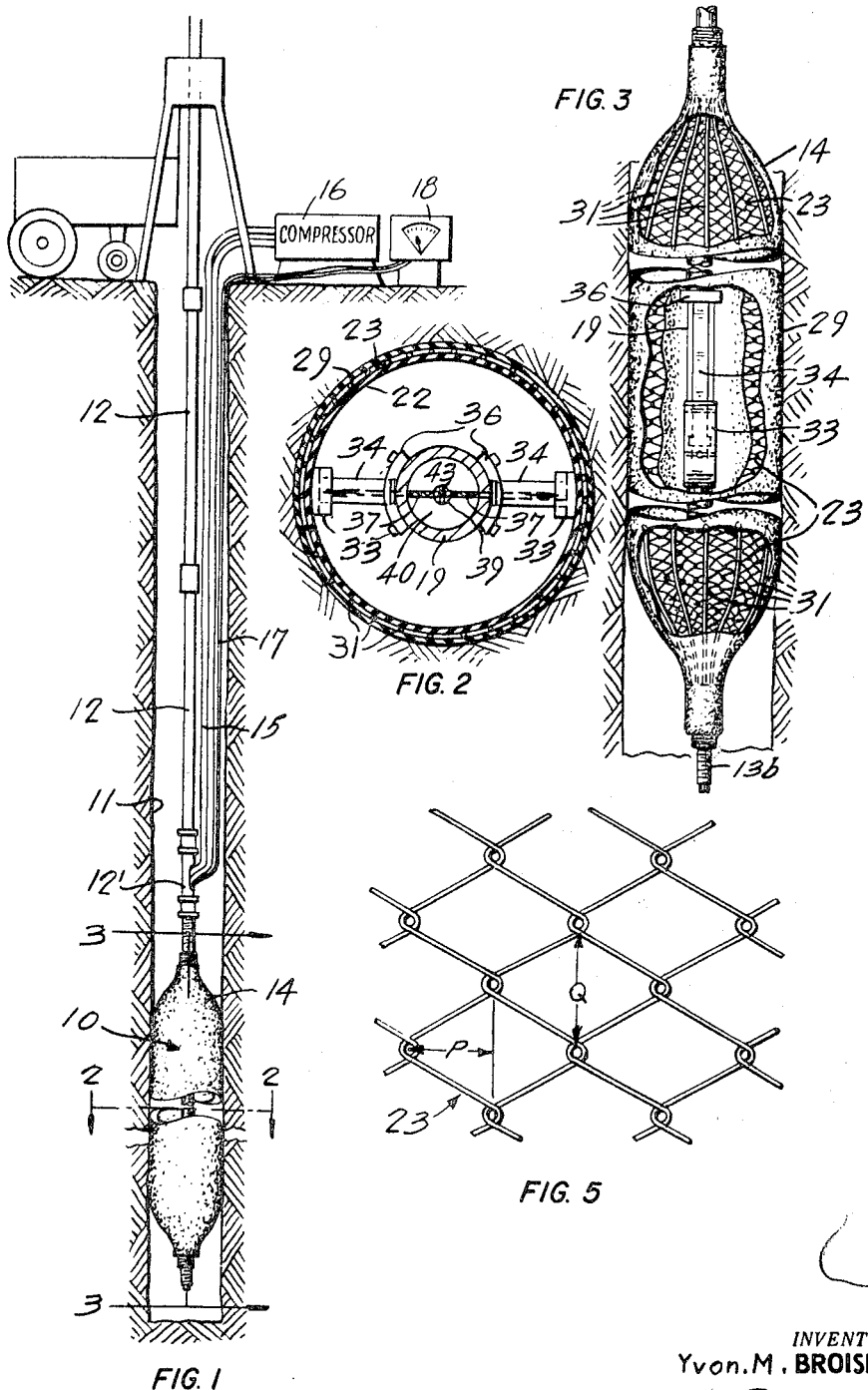

3,442,123
TESTING PROBE FOR SOILS
Yvon Marie-Xavier Broise, Chomedey, Quebec, Canada, assignor of one-half to Alan Thorley, Dorval, Quebec, Canada
Filed May 1, 1967, Ser. No. 635,190
Int. Cl. E21b 47/00
U.S. Cl. 73—151      12 Claims

ABSTRACT OF THE DISCLOSURE

A testing probe having a fluid-inflatable sleeve adapted to be expanded against the wall of a bore for measuring the degree of recession of the wall under such expansion in relation to the fluid pressure applied, expansion restricting means in the form of an umbrella of spokes being attached at each end of the expandable sleeve and adapted to expand with the sleeve to engage the wall of the bore and to present an abutment surface to prevent a longitudinal blow-out of the sleeve, and potentiometer means for electrically measuring the recession of the wall.

---

The present invention relates to testing probes, and in particular, to a testing probe of the kind adapted for insertion within a bore for measuring the bearing capacities and other mechanical properties of soils, rock, concrete and other similar material and including a core member and surrounding the core member a fluid-inflatable sleeve of resiliently expandable material impermeable to said fluid, together with means for leading said fluid to said sleeve for expanding it against the wall of the bore and means for measuring the degree of recession of the wall under such expansion in relation to the fluid pressure applied.

Known sleeves of this type suffer from the disadvantage that they are liable to blow-out in the axial or longitudinal direction where there is no restriction, as provided by the wall of the bore in the lateral direction, for preventing further expansion of the sleeve under the fluid pressure within. If there are delicate measuring instruments within the sleeve, these may be damaged by the shock of blow-out or by the ingress of water which may be present in the bore, further aggravating the problem.

Copending United States application Ser. No. 599,021, filed on Dec. 5, 1966, to Yvon Broise and Alan Thorley describes one means of overcoming this problem, in which the sleeve is encased in one or more screens of wire mesh which are deliberately allowed to expand longitudinally and in which the measurement is made in terms of the longitudinal expansion so produced under the internal pressure and the resistance of the wall of the bore. However, it has been found that in some circumstances the longitudinal movement against the frictional resistance of the bore can give rise to inaccurate and misleading results.

It is accordingly an object of the present invention to provide a soil testing probe with a satisfactory means of preventing or restricting the likelihood of longitudinal blow-out of the inflated sleeve.

It is a subsidiary object to provide, in a probe, a satisfactory and simple means for measuring the soil recession of the walls of the bore which is not subject to distorted results.

In accordance with the invention, there is provided in a probe of the kind above defined, the improvement comprising expansion restricting means circumferentially arranged and located adjacent each end of the sleeve for restricting expansion in the axial direction, said expansion restricting means including a plurality of members of restricted flexibility attached at one end to said core member and each extending generally axially around the respective end portion of the sleeve towards a free end engageable, upon expansion of the sleeve, with the wall of the bore to cause said expansion restricting means to present collectively an abutment surface to said sleeve, the members being retractable towards said core upon deflation of said sleeve.

The expansion restricting means may take the form of or comprise a plurality of resilient spokes distributed circumferentially about the probe and each attached to the core member at one end and extending to a free end in a direction generally axially towards the centre of the sleeve. The spokes may be biased by their resilience in the direction of retraction, so as to collapse inwards when the internal pressure in the sleeve is removed. In this case, they may be rigidly attached at the said one end with respect to the core. Alternatively, or in addition, they may be surrounded by a secondary cover sleeve of resiliently expandable material, which may assist the process of collapse, and which also prevents entanglement of the spokes in the wall of the bore. In another alternative, resiliently mounted rigid members may be employed.

Preferably, a first reinforcement sleeve of mesh material surrounds the inner fluid-inflatable sleeve, the mesh material being expandable in both directions and being of sufficiently small mesh to prevent damage to the inflatable sleeve from hard projections in the wall of the bore. A cover sleeve as described above preferably covers the reinforcement sleeve to cause the necessary retraction of the reinforcement sleeve, which is not self-resilient, upon deflation of the fluid-inflatable sleeve.

The spokes may, for example, be provided between the reinforcement sleeve and the cover sleeve, or if desired, within the reinforcement sleeve.

The measuring means preferably includes diametrically opposed inner probe elements on or within said inflatable sleeve and arranged to diverge in contact with said inflatable sleeve as it expands, and vice versa, and a potentiometer having a movable contact which is connected to said inner probe elements for movement in proportion to the convergence and divergence thereof.

Having generally described the invention, a preferred embodiment thereof is hereafter described in greater detail with reference to the accompanying drawings, in which:

FIGURE 1 is a partly diagrammatic representation of the probe in expanded position in a bore hole illustrating the operation of the probe;

FIGURE 2 is an enlarged lateral cross-section along the line 2—2 of FIGURE 1;

FIGURE 3 is an enlarged schematic longitudinal cross-section (not to scale) along the line 3—3 of FIGURE 1;

FIGURE 5 is a greatly enlarged view of the preferred form of reinforcement sleeve in a partly expanded condition, viewed towards the surface thereof.

Figure 4:
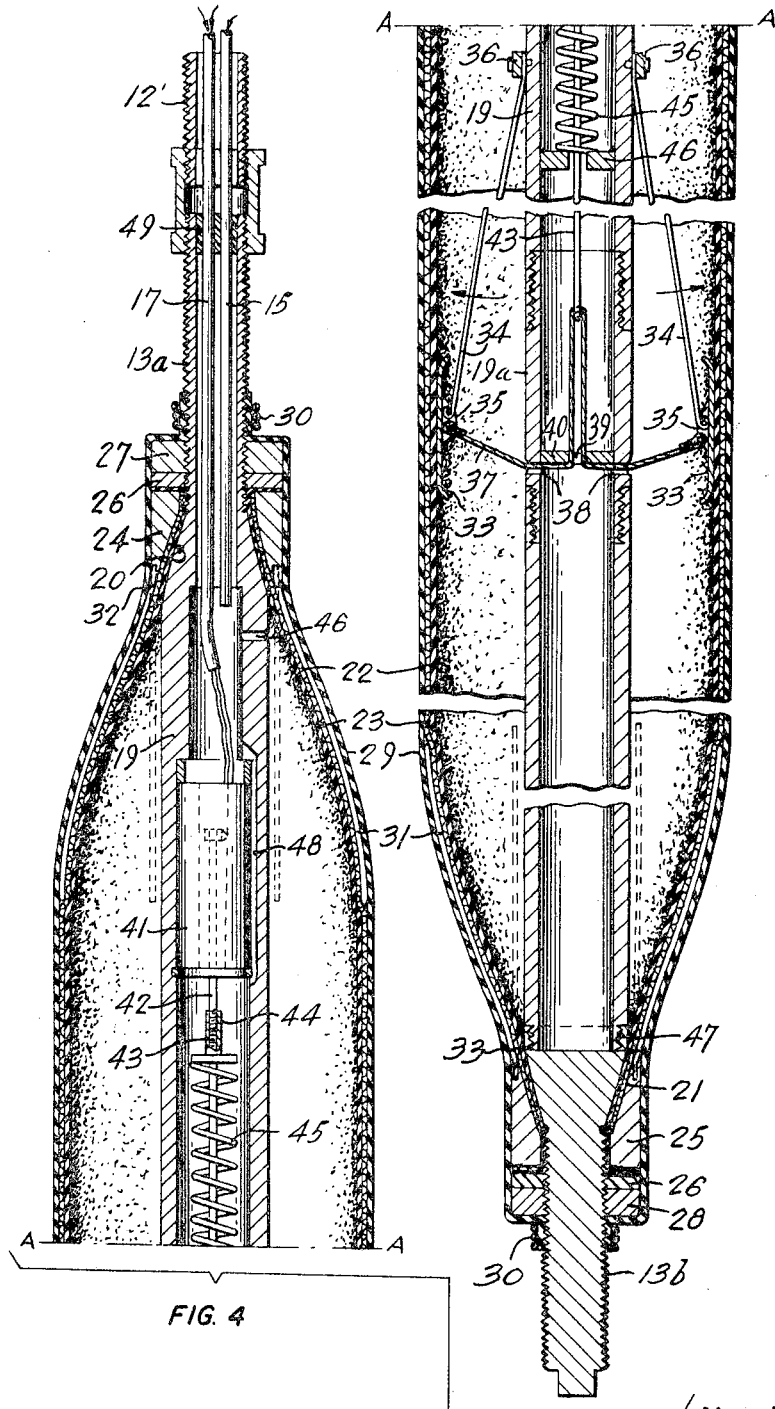
FIGURE 4 is a longitudinal cross-section (approximately to actual size) of the operative part of the probe in a partly expanded position, that is, out of contact with the wall of the bore.

FIGURE 1 illustrates the probe in operation and shows the probe 10 suspended by means of drill rods 12 in a testing bore, the wall of which is indicated at 11. The probe 10 is inclusive of an axial core member 13 which takes the form of a steel tube forming an extension of and coupled to the drill rods 12. Surrounding the core member are a number of sleeve-like components, at least one of which is fluid-inflatable, the sleeves being collectively shown at 14 in FIGURE 1 in engagement with the wall 11 of the bore. The expandable sleeve components are forced laterally into engagement with the wall 11 by fluid fed along a lead line 15 through the core member 13 into the space between the core and the inner of the sleeve components and pumped from compressor 16. The fluid preferably takes the form of a compressed gas such as air or carbon dioxide, but might also consist of a liquid. Within the sleeve components there are provided electrical measuring means to be described, and connectors 17 are led through the core 13 and upwardly out of the bore to external measuring means generally indicated at 18.

Details of the probe are best viewed in FIGURE 4. The core member 13 is threaded at the ends 13a, 13b, end 13a being coupled by the threads to the drill rods 12. It will be appreciated that if the drill rods 12 are not of hollow section, the leads from the compressor and external measuring device may be passed out of the portion 13a and directly up the bore, or if necessary, an apertured adaptor rod 12', as shown, may be provided to form a connection between the ends 13a and the first drill rod proper for this purpose.

Between the ends 13a, 13b the core member 13 is of enlarged cross-section shown at 19, and between the portion 19 and the portions 13a, 13b, there are formed frusto-conical shoulders 20, 21. The end 13b of the core is preferably made solid and connected to the core portion 19 through a threaded connection 47 so as to block the lower end of the hollow portion 19. The hollow end of portion 13a of the core is plugged around the pipe 15 in the sleeve 17 with a body 49 of, for example, a synthetic resin material such as a filled epoxy resin, in order to seal the end of the hollow core.

Immediately surrounding the core 13 and covering the portion 19 is an inner sleeve 22 of resiliently expandable material such as rubber. Closely covering the inner sleeve 22 is a reinforcement sleeve 23 of a mesh material expandable in both dimensions and composed, for example, of wire mesh. The mesh should be sufficiently small to prevent damage to the inflatable sleeve 22 from hard projections in the wall of the bore. The preferred form of the mesh sleeve 23 is illustrated in FIGURE 5, the wire being, for example, 0.01 inch stainless steel. The dimension P shows the free movement allowed laterally which may be, for example, 0.15 inch but may be, for example, from 0.1 to 0.25 inch. (The mesh apertures are exaggerated in size in FIGURE 3 for clarity.) In the fully contracted condition, the dimension Q should be as small as possible, the wires preferably lying in an almost parallel arrangement. It will be appreciated that the mesh may alternatively be of a suitably hard and resistant plastics material such as nylon.

The ends of the sleeves 22, 23 are compressed and held against the frusto-conical shoulders 20, 21 by clamp nuts 24, 25, which are formed with corresponding frusto-conical shoulders for this purpose. Washers 26 and lock nuts 27, 28 secure the clamping nuts 24, 25 in their clamped position. The ends of sleeve 22 (and mesh 23 if desired) may be turned out radially so as to be locked under washers 26. Closely surrounding the reinforcement sleeve 23 is an outer cover sleeve 29 also of a resiliently expandable material such as rubber. The cover sleeve 29 surrounds the clamping nuts, washers and lock nuts at each end and may be secured to the core portions 13a, 13b by strapping 30.

In accordance with the invention, expansion restricting means are provided at each end of the probe for restricting expansion in the axial direction so as to prevent blow-out of the inflatable sleeve members in the longitudinal axial direction. In the preferred embodiment, this takes the form of a plurality of resilient spokes 31, circumferentially arranged at each end around the core 13 and having a general resemblance to the spokes of an umbrella. The spokes are each embedded at one end into respective clamping nuts 24, 25, in suitable bores drilled in radial shoulders 32, 33 at the inward ends of respective clamping nuts 24, 25, so that the spokes are resiliently biased or stressed radially inwardly under their natural resilience. The spokes may, for example, be composed of sprung steel and be 5 inches long and 3/32 inch in diameter. Preferably as many spokes are accommodated as possible in dependence upon the diameter of the clamping nuts 24, 25. It should be appreciated that the sleeves and spokes in FIGURE 4 are shown in a partly inflated condition for the sake of greater clarity. In the completely uninflated condition, the spokes will lie substantially axially flat against the portion 19 as indicated in dotted lines.

The measuring device is inclusive of a pair of opposed inner probe elements in the form of metal or plastic pads 33. The pads 33 are supported by means of resilient connectors such as leaf springs 34, attached to one end to each element 33 through a central flange 35 on the elements 33, which preferably allows some pivotal motion between spring connectors 34 and the pads 33 enabling the pads 33 to lie flat against the inner surface of inner sleeve 32. The opposite ends of the spring connectors 34 are rigidly connected to the exterior surface of inner core portion 19, for example, by bolted clamp elements 36. The spring elements 34 have a radially outward bias so as to urge the pads 33 out diametrically oppositely.

The pads 33 are also interconnected by a resilient linkage 37, which may, for example, be a nylon cord and which extends diametrically across the interior of core is passed through diametrically opposite apertures 38 in the wall of core element 39, and a loop of the linkage is passed axially through a bore 39 in a guide member 40, which extends diametrically across the interior of core portion 19 and which may take the form of a welded metal disc or a force-fitted plastic element. A potentiometer 41 is mounted within the core portion 19 at a spaced location axially from the guide 40. The potentiometer 41 is of the well-known type in which the contact arm is moved or displaced linearly in an axial direction. The contact arm 42 of the potentiometer is connected to an extension 43 by means of a flanged coupling sleeve 44. The other end of the extension 43 is formed with an aperture (or alternatively a loop or hook) through which is passed the end of the axially directed loop of the linkage 37. A compression spring 45 is located around the extension 43 between the flange of sleeve 44 and an abutment 46 and maintains the linkage 37 taut at all times. However, the force of the spring 45 is less than the combined force of the spring connectors 34, so that at all times the pads 33 are positioned against the inner surface of inner sleeve 22.

To enable the various components of the electrical measuring device to be located in position, part of the core portion 19a in which the guide 40 is located, is made as a separate piece or adaptor threadedly connected to the remainder of portion 19. The electrical leads 17 are connected to the potentiometer 41.

A groove 48 allows fluid communication between the parts of the hollow interior of core portion 19 on both sides of the potentiometer 41.

It will be apparent from this arrangement that as the sleeve 22 is expanded outwards, the pads 33 follow this movement, and the movement is transferred to the arm 42 of the potentiometer which is thereby enabled to register by electrical means through the external measuring device 18 the result of any motion towards or away from each other of the pads 33.

Thus, in operation, when the probe is positioned as shown in FIGURE 1 and compressed air, for example, is passed from compressor 16 at a predetermined pressure through pipe 15, the sleeve components are inflated by passage of the compressed fluid through an aperture 46 in the wall of core portion 19 to bring the exterior surface of the cover sleeve 14 into engagement with the wall 11 of the bore. The position of the potentiometer arm being registered at this point by measuring device 18, any further movement outwards of the sleeves upon a predetermined increase in fluid pressure, which is followed by pads 33, may be registered and correlated against the increase in pressure resulting in such movement.

The whole of the interior of the core portion 19, and up as far as the end of portion 13a and downwardly as far as the closed end of the core adjacent shoulders 21 is filled with the compressed fluid which, as previously indicated, is preferably a gas. When the probe is in position and inflated, the pressure is normally in excess of any head of water which may be present in the bore hole so that in the event that the sleeves burst or leak, the water is prevented from entering the hollow interior of the core portion 19 and damaging the measuring instruments.

As the inner sleeve 22 is inflated, the spokes 31 are deformed against their natural resilience and within the outer cover 29 and engage as best illustrated in FIGURE 3 against the wall 11 of the bore hole at their free exterior ends, so as to present an abutment framework surface restricting further axial longitudinal movement of the sleeve components 22, 23 which are within the spokes. Thus, longitudinal blow-out of the comparatively delicate rubber inner sleeve 22 is virtually eliminated. The ends of the spokes are prevented from catching in the walls of the bore hole by the outer cover 29, and since this cover is also resiliently expandable, it assists in collapsing the spokes as well as the non-resilient expandable mesh 23 when the interior pressure is removed, so as to allow unimpeded insertion and withdrawal of the probe.

It will be apparent that many modifications may be made within the scope of the invention as defined in the following claims, and the following modifications are given by way of example.

The spokes may be replaced by other members of restricted flexibility, that is, of a flexibility which is not so much as to detract from the service of the members as an abutment when they are anchored against the wall of the bore hole. Thus, they may be, for example, flat blades, but in this case the number which could be incorporated around the core would be reduced. To increase the total number of elements, of whatever kind, the anchorage in the clamping nuts 24, 25 may be arranged in a plurality of concentric circles instead of one circle, the embedding holes being preferably staggered. To increase the abutment surface further, the spokes may be interconnected by collapsible web members in the form of a linkage or of a fabric or they may be embedded in a rubber fabric. Furthermore, the spokes or equivalent elements need not themselves be resilient, but may either be mounted through the use of springs to the core or may be simply pivotally mounted to the core, reliance being placed upon the resilience of the outer cover 29 for their collapse upon removal or release of the pressurized fluid.

In the broadest aspect of the invention, any type of suitable measuring device may replace the potentiometer mechanism illustrated in the preferred embodiment. More than one pair of pads 33 may, for example, be used, such as additional pairs disposed at right angles to the pair illustrated and connected by a second linkage to the potentiometer arm extension 43 in a similar manner. The existing linkage may be replaced by a crank type of linkage for rotating the arm of a rotating type potentiometer.

If desired, more than the shown number of sleeve components may be used. Thus, more than one reinforcement sleeve of mesh may, if desired, be used, the meshes, for example, having different mesh size and strength, a large strong mesh being used in conjunction with a finer and/or delicate mesh. In the same way, more than one outer cover sleeve may, if desired, be utilized.

While the spokes or equivalent members have been shown located between the reinforcing sleeve and the outer cover sleeve, they may, if desired, be inserted within the reinforcing sleeve, the reinforcing sleeve being clamped by other means, for example, under the cover sleeve 29.

For use with hard material such as rock or concrete, studs may be fitted to the outer surface of the outer cover sleeve and connected through the sleeves to the inner probe elements, so that the recession of the wall is directly transmitted to the inner probe elements, the studs being clamped in place to the inner probe elements to prevent tearing of the sleeves when they expand, and to form a secure seal.

I claim:
1. In a testing probe adapted for insertion within a bore for measuring the bearing capacities and other mechanical properties of soils, rock, concrete and other similar material and including a core member and surrounding the core member a fluid-inflatable sleeve of resiliently expandable material impermeable to said fluid, together with means for leading said fluid to said sleeve for expanding it against the wall of the bore and means for measuring the degree of recession of the wall under such expansion in relation to the fluid pressure applied, the improvement comprising:

expansion restricting means circumferentially arranged and located adjacent each end of the sleeve for restricting expansion in the axial direction, said expansion restricting means including a plurality of members of restricted flexibility attached at one end to said core member and each extending generally axially around the respective end portion of the sleeve towards a free end engageable, upon expansion of the sleeve, with the wall of the bore to cause said expansion restricting means to present collectively an abutment surface to said sleeve, the members being retractable towards said core upon deflation of said sleeve.

2. The improvement of claim 1 wherein the said members are resiliently biased in the radially inward direction.

3. The improvement of claim 2 further comprising a first reinforcement sleeve of mesh material surrounding said fluid-inflatable sleeve, which mesh material is expandable in both dimensions, and of sufficiently small mesh to prevent damage to said inflatable sleeve from hard projection in the wall of the bore, and a cover sleeve of resiliently expandable material covering said reinforcement sleeve to cause retraction of said reinforcement sleeve upon deflation of the fluid-inflatable sleeve.

4. The improvement of claim 1 wherein said expansion restricting means comprises a plurality of resilient spokes distributed circumferentially about said probe and each rigidly attached with respect to said core member at one end and extending to a free end in a direction generally axially towards the centre of said sleeve, the spokes being biased by their resilience in the direction of retraction.

5. The improvement of claim 4 further comprising a first reinforcement sleeve of mesh material surrounding said fluid-inflatable sleeve, which mesh material is expandable in both dimensions, and of sufficiently small mesh to prevent damage to said inflatable sleeve from hard projections in the wall of the bore, and a cover sleeve of resiliently expandable material covering said reinforcement sleeve to cause retraction of said reinforcement sleeve upon deflation of the fluid-inflatable sleeve, wherein said reinforcement means lies within the spokes.

6. The improvement of claim 1 further comprising a first reinforcement sleeve of mesh material surrounding said fluid-inflatable sleeve, which sleeve is expandable in both dimensions, and of sufficiently small mesh to prevent damage to said inflatable sleeve from hard projections in the wall of the bore, and a cover sleeve of resiliently expandable material covering said reinforcement sleeve to cause retraction of said reinforcement sleeve upon deflation of the fluid-inflatable sleeve.

7. The improvement of claim 6 wherein said cover sleeve surrounds said members and constitutes at least in part means for resiliently biasing said elongate members in the radially inward direction.

8. The improvement of claim 1 wherein said measuring means includes diametrically opposed inner probe elements on or within said inflatable sleeve and arranged to diverge in contact with said inflatable sleeve as it expands, and vice versa, and a potentiometer having a movable contact which is connected to said inner probe elements for movement in proportion to the convergence and divergence thereof.

9. The improvement of claim 8 wherein opposed inner probe elements are interconnected by a flexible linkage and said potentiometer contact is slidable linearly and connected directly or indirectly to a central part of said flexible linkage, said contact being resiliently biased in a direction away from said linkage and said inner probe elements being resiliently biased outwardly by a slightly greater amount, said measuring means further including guide means arranged to allow a loop of said linkage to pass in axial direction towards said potentiometer at said part, the axial extent of such loop varying as the means of respective inward displacements of said opposed inner probe elements.

10. The improvement of claim 8 wherein said inner probe elements are directly mechanically connected through a sealed connection to stud elements located on the outside surface of the outer cover for transmitting the wall recession directly to the inner probe elements.

11. The improvement of claim 1 wherein the interior of the core portion lying within the inflatable sleeve is in communication with the interior of the inflatable sleeve and with the fluid lead but otherwise sealed.

12. In a testing probe adapted for insertion within a bore for measuring the bearing capacities and other mechanical properties of soils, rock, concrete and other similar material including a core member and surrounding the core member a fluid-inflatable sleeve of resiliently expandable material impermeable to said fluid, together with means for leading said fluid to said sleeve for expanding it against the wall of the bore and means for measuring the degree of recession of the wall under such expansion in relation to the fluid pressure applied, the improvement comprising:

expansion restricting means circumferentially arranged and located adjacent each end of the sleeve for restricting expansion in the axial direction, said expansion restricting means including at least one member of restricted flexibility attached at one end to said core member and extending generally axially around the respective end portion of the sleeve towards a free end engageable, upon expansion of the sleeve, with the wall of the bore to cause said expansion restricting means to present an abutment surface to said sleeve, the members being retractable towards said core upon deflation of said sleeve.

References Cited

UNITED STATES PATENTS

| | | | |
|---|---|---|---|
| 2,643,722 | 6/1953 | Lyres et al. | 166—187 X |
| 2,828,823 | 4/1958 | Mounce | 166—187 |
| 2,957,341 | 10/1960 | Menard | 73—84 |
| 3,283,823 | 11/1966 | Warrington | 166—187 |
| 3,364,737 | 1/1968 | Comes | 73—151 |

RICHARD C. QUEISSER, *Primary Examiner.*

J. W. MYRACLE, *Assistant Examiner.*

U.S. Cl. X.R.

73—84